United States Patent
Bourke et al.

(10) Patent No.: US 7,120,423 B2
(45) Date of Patent: Oct. 10, 2006

(54) ENHANCED CALL BARRING

(75) Inventors: Tom Bourke, Cork (IE); Conor P. Lynch, Monaghan (IE); Colm A. O'Farrell, Cork (IE)

(73) Assignee: Motorola, Inc., Schaumburg, IL (US)

( * ) Notice: Subject to any disclaimer, the term of this patent is extended or adjusted under 35 U.S.C. 154(b) by 118 days.

(21) Appl. No.: 10/616,657

(22) Filed: Jul. 10, 2003

(65) Prior Publication Data

US 2005/0009503 A1    Jan. 13, 2005

(51) Int. Cl.
*H04M 1/66* (2006.01)
(52) U.S. Cl. .................................................... 455/411
(58) Field of Classification Search ................ 455/411, 455/558

See application file for complete search history.

(56) References Cited

U.S. PATENT DOCUMENTS

| 5,884,193 A | 3/1999 | Kaplan ........................ 455/565 |
| 6,085,080 A | 7/2000 | Rahikainen et al. ......... 455/403 |

*Primary Examiner*—William D. Cumming
(74) *Attorney, Agent, or Firm*—Charles W. Bethards (57) ABSTRACT

A system 230, communications unit 101, and method (FIG. 3), for dynamically controlling access to services in an unobtrusive manner is disclosed, where the method includes receiving a request for services (303) and denying the request until a security screen is satisfied (315), unless those services have been recently accessed (309).

22 Claims, 5 Drawing Sheets

ENHANCED CALL BARRING

FIELD OF THE INVENTION

The present invention relates to wireless communications, and more specifically to methods and apparatus for implementing call barring at a communications unit.

BACKGROUND OF THE INVENTION

Current cellular and wireless technology enables a built-in level of security protection through the use of a numeric code, sometimes referred to as a personal identification number (PIN). Such a feature enables subscribers to set security features such as phone lock and keypad lock to prevent unauthorized use or misuse of the subscriber device. In addition, modern cellular communication systems, such as Global System for Mobile Communication (GSM) use subscriber identity modules or SIM cards to personalize phone units into which the SIM cards are installed. Conventional SIM cards are smart cards that include user specific data. The data can, for example, define an international subscriber directory number (ISDN) or phone number, identity of the subscriber, memorized speed dialing numbers, unit features to which the subscriber has subscribed, and a security key.

The SIM card data or information can be protected using a SIM PIN security feature. An authentication process is performed during registration of a handset with the SIM card installed and the system or infrastructure and prior to permitting incoming and outgoing calls. Only if the authentication process is successful (user enters correct PIN) will the registration or call be allowed to take place.

To maintain system security, the SIM card is constructed so that its cryptographic security key cannot be read from or otherwise divulged by the SIM card. Thus, the SIM card allows the system to provide communication services only when authentication is successful, thus reducing the theft of communication services by unauthorized users. In such a conventional communications or cellular phone unit, barring a user's call can be obtrusive or obstructive when the user is prompted for a PIN each time an attempt is made to either make or receive a call. Additionally, if such a call barring feature is not enabled, the phone is open to fraudulent use if it is misplaced or stolen.

Therefore, what is needed is a method, and apparatus for dynamically controlling access to services, such as call services, in an unobtrusive manner.

BRIEF SUMMARY OF THE INVENTION

The present invention concerns a system for controlling access to services available from a communications unit and the communications unit, wherein the system includes a memory arranged to store a plurality of identification numbers; and a processor coupled to the memory and responsive to a request for access to services, wherein the processor denies the request for access to the services until a security screen is satisfied, unless access to the services corresponds to one of the plurality of identification numbers that has recently been used in accessing services. Note that the communication unit embodiment includes an interface for providing the request for access to services.

In another aspect, a method for controlling access to services available from a communications unit is described, wherein the method comprises providing a plurality of identification numbers; receiving a request for access to services; and processing the request for access to services. The processing further comprises granting the request for access to the services when a security screen has been satisfied, and denying the request for access to the services when the security screen has not been satisfied, unless access to the services corresponds to one of the plurality of identification numbers that has recently been used in accessing services.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF THE PRESENTLY PREFERRED EXEMPLARY EMBODIMENTS

In overview, the present disclosure concerns systems, methods, and equipment or apparatus that provide communications services to users of such systems and equipment and specifically techniques for implementing enhanced call barring capability. More particularly various inventive concepts and principles embodied in systems, communications units, and methods therein for providing, initiating, or facilitating novel and non-intrusive call barring are discussed and described. Note that the communications units for providing or facilitating call barring and other services can be a variety of devices, such as a personal digital assistants, personal messaging units, personal computers, a cellular handset or device, or equivalents thereof where such units are preferably arranged and constructed for operation in a network, preferably a wireless network, such as a wide area network or local area network.

The communications systems and communications units that are of particular interest are those that may provide or facilitate voice or data or messaging services over wide area networks (WANs), such as conventional two way systems and devices, various cellular phone systems including analog and digital cellular, CDMA (code division multiple access) and variants thereof, GSM, GPRS (General Packet Radio System), 2.5 G and 3G systems such as UMTS (Universal Mobile Telecommunication Service) systems, integrated digital enhanced networks and variants or evolutions thereof. Furthermore the wireless communications units or devices of interest can have short range communications capability normally referred to as W-LAN capabilities, such as IEEE 802.11, Bluetooth® capabilities, or HiperLan and the like that preferably utilize CDMA, frequency hopping, or TDMA access technologies and one or more of various networking protocols, such as TCP/IP (Transmission Control Protocol/Internet Protocol), IPX/SPX (Inter-Packet Exchange/Sequential Packet Exchange), Net BIOS (Network Basic Input Output System) or other protocol structures.

As further discussed below various inventive principles and combinations thereof are advantageously employed to bar, preclude, or disallow access to various services, such as calling services and other applications, internal or external to the communications unit unless a security screen, such as a personal identification number (PIN) has been entered and validated. Note that this general rule will have various exceptions where the PIN need not be entered and validated or revalidated where such exceptions include for example services that have recently been accessed and others that will be further explained and developed below. In this manner a user can access services with a minimum of intrusive and annoying entering, checking, and rechecking of the user's PIN number and yet appropriate levels of security or protection against fraudulent usage can be maintained provided these principles or equivalents thereof as discussed below are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

Figure 1:
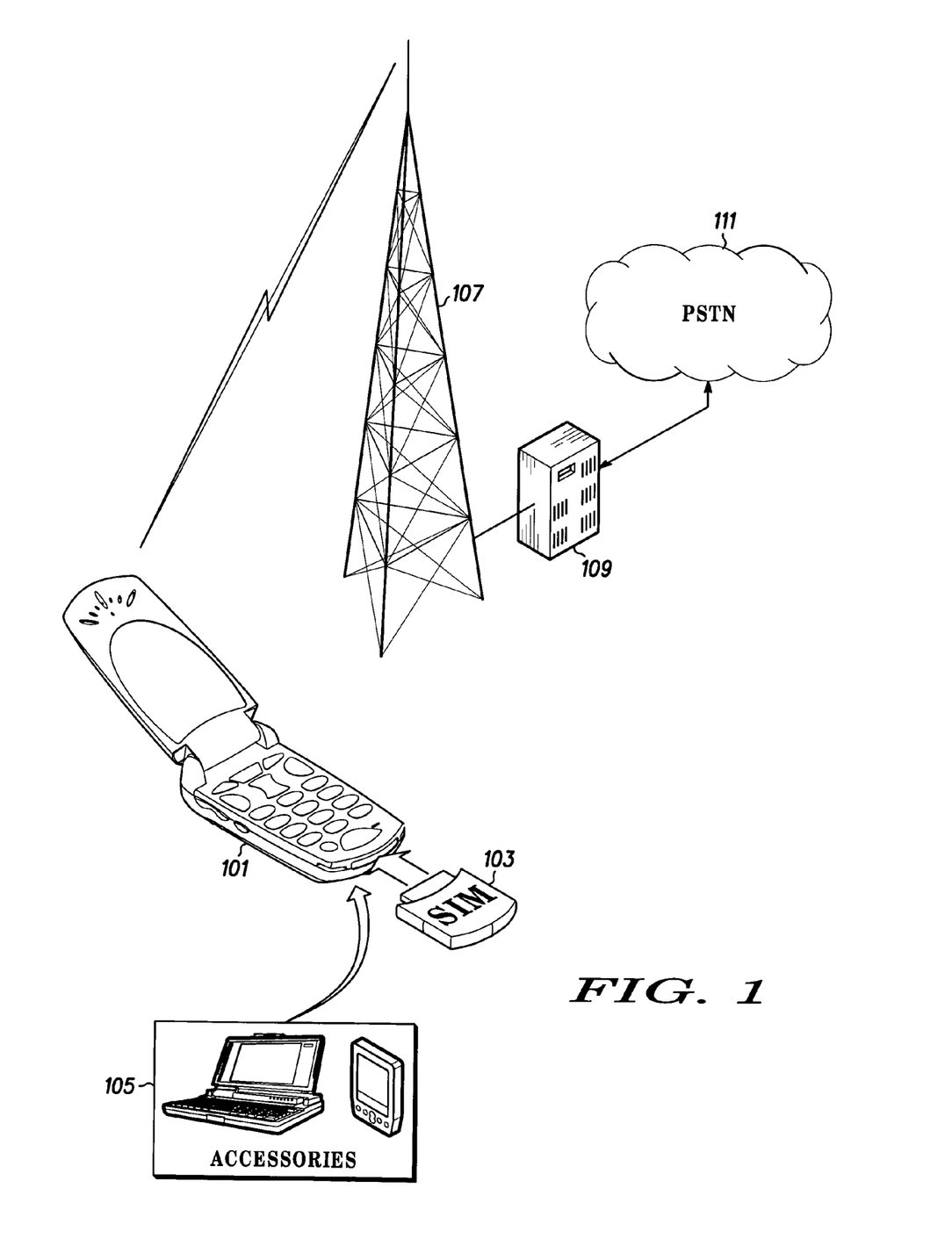
FIG. 1 is a diagram of an exemplary wireless communication environment that is capable of supporting a communications unit using call barring.

Referring to FIG. 1, a diagram of an exemplary wireless communication environment or system that is capable of supporting a communications unit using enhanced call and services barring will be described and discussed. A simplified diagram is shown of various components that are typical of an illustrative embodiment of a wireless communications system. A communications device 101, such as a cellular handset or the like is shown with a SIM card 103. As noted earlier the SIM card is suitable for personalizing the communications device and adding a layer of security for access to services and the like available via the communications device. The communications device is further shown with an assortment of accessories 105 (e.g., PDA, laptop, audio players, games, etc.) that may be coupled to or accessed through the communications unit. A local area network (LAN) transceiver (not specifically depicted) can also be available where this LAN transceiver capability can be one of the accessories or can be an integral part of the communications unit and allow for services from or resident on a LAN to be accessed through the communications unit. Services, such as calling services and other remote applications and services are supported by the wireless communication system. This system comprises: a radio access network including one or more base sites or stations 107 coupled to a base site controller and mobile switching center (BSC/MSC) 109. The BSC/MSC 109 is further inter coupled with one or more networks such as a Public Switched telephone network (PSTN) 111, Internet or World Wide Web. The wireless communication system is compliant with one or more air interface standards, such as but not limited to GSM, CDMA, 3G, etc., and is capable of providing two-way voice or data communications, or both, between the communications unit and other parties.

Upon power up of the communications unit 101, the SIM card 103 when installed or inserted will normally prompt a user for a personal identification number (PIN) to unlock the SIM card allowing access to the subscriber information contained therein as well as services through the communications unit or handset, such as though from the optional accessories 105, those available via internal applications, or those available from remote servers accessible via a wireless link such as the communications system or a LAN.

Figure 2:
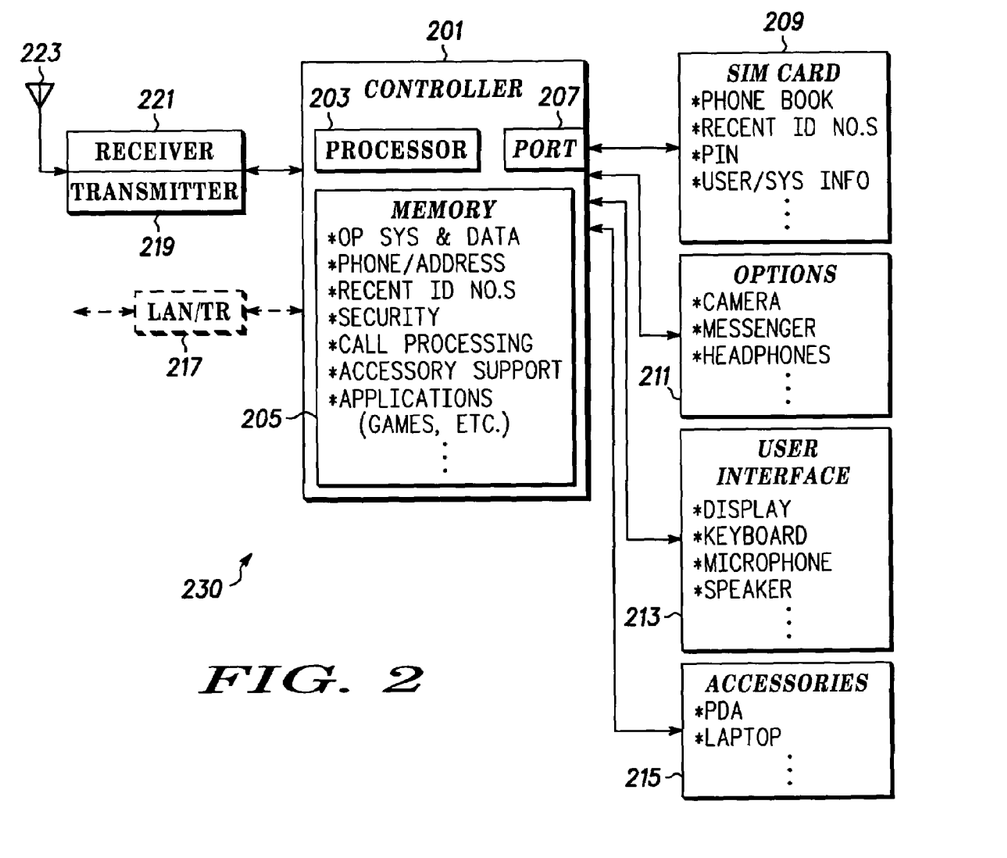
FIG. 2 is a block diagram of an embodiment of a communications unit arranged to utilize enhanced call barring in the wireless communication environment of FIG. 1.

Referring to FIG. 2, a block diagram of an embodiment of a communications unit arranged to utilize enhanced call/service barring for controlling access to services in the communication environment of FIG. 1 will be described and discussed. The communications unit includes a controller 201. Controller 201 includes a processor 203, such as one or more microprocessors and digital signal processors that are widely available from suppliers such as Motorola, Inc. and a memory 205, including some combination of internal and external memory comprising commercially available RAM, ROM, EEPROM, magnetic memory, and the like. The controller 201 is generally responsible for controlling the other elements of and enabling the management of many of the features and functions of the communications unit 101 as well as call processing, message interpretation, vocoder duties and so on.

The controller accomplishes its responsibilities and duties by virtue of the processor 203 executing software and accessing data that is stored in the memory 205. The memory 205 stores an operating system, data and variables, phone books and address databases, identifiers or numbers or addresses for recent phone calls inbound or outbound or services that have been accessed. Further included are security routines, call processing software, accessory support or drivers, applications, such as games and utilities, as well as other routines or programs, such as user interface drivers and the like that are too numerous to mention but that are known and appreciated by those of ordinary skill.

The controller further includes a port 207 that is coupled to one or more of a SIM card 209, options 211, a user interface 213, and various accessories 215 and is used by the processor to send and receive data from these elements. Generally the controller 201 cooperatively operates with the user interface 213, options 211, accessories, and SIM care if available to enable operation of the communications unit 101 by a user thereof.

A SIM card 209 is typically inserted in a compartment of the communications unit 101 and is a convenient approach for transferring information that is specific to a user from one unit to another when available. The SIM card 209 is removable and capable of being inserted into other communications units. The SIM card 209 stores information such as phone book, recently used or accessed identification numbers, PIN data and user/system information among other items. Much of this information remains stored on the SIM card 209 when transferring it between communications units. Upon insertion of the SIM card 105, the communications unit 101 may or may not prompt the user through the user interface 213 to enter a personal identification number (PIN) to unlock the SIM card allowing access to the subscriber information contained therein. If requested and upon successfully entering the SIM card access PIN, the communications unit 101 will register with the appropriate communications system and services.

The options as shown include a variety of add on devices, such as a camera, messaging unit, head phones, speaker phone elements etc. Access to all of these options can be conditioned on successfully meeting security criteria as determined via the SIM card in conjunction with or solely by the security routines in the memory 205.

The user interface 213 is used to convey information between a user and the communications unit 101 or otherwise interact with the user. The user interface 213 normally includes a keyboard, display, microphone, and speaker. The user interface and constituent elements are well known and commercially available and need not be discussed further. The interface or user interface can be user to request access to the various services or for entering a personal identification number (PIN) to satisfy the security screen.

The accessories 215 include such items as a personal computer, a personal digital assistant (PDA), an audio player, etc that can be connected to and accessed via the controller 201. These accessories 215 may be linked using hardwire connections or wireless connections, such as IEEE 802.11, Bluetooth® technology, pico-radio, or other known wireless transmission technology. These accessories may include a LAN transceiver module 217 that can be used to access various LANs such as show up in well known coffee shops, airports, homes, or businesses, and the like.

Further included in the communications unit of FIG. 2 is a transmitter 219 and a receiver 221 each coupled to an antenna. The antenna couples a received signal from the cellular communications system or base site 107 to the receiver 221 which provides a base band signal to the controller for call processing and the like. The controller formulates and forwards to the transmitter a signal for up conversion, amplification and so on with the amplified signal coupled to the antenna 223 and transmitted to the base site. These elements and functions are used to exchange for example subscriber registration information, registration status information, call setup information, and speech/data/fax information with the base site. The transmitter 219 preferably comprises well-known circuitry and software such as that used in amplifiers, modulators, up converters, filters and the like. The receiver 221 preferably comprises well-known circuitry and software such as that used in amplifiers, demodulators, down converters, filters, etc. These are well known and widely available and thus not further described.

The controller 201, specifically processor 203 in the wireless communication unit executes software preferably included with the operating system and security routines that are stored in the memory 205 to effect enhanced call/service barring as further discussed and described below. The controller 201, e.g. processor 203 and memory 205 together with the user interface 213 can be viewed as a system 230 within the communications unit that operates to control access to services available from the communications unit.

In operation the communications unit is arranged and constructed and operates to have or provide controlled access to services. The communications unit includes the memory 205 comprising for example one of internal or external memory, such as the SIM card, that is arranged to store a plurality of identification numbers, such as telephone numbers, unit identification numbers and user identification numbers or other indicia of services in a phone book or the like. Further is the interface or user interface 213 for providing a request for access to services, such as calling services or other services from for example options or accessories or remote services and applications accessible through the communications unit via for example the base site 107 and corresponding communications system or a wireless LAN system. Further included is the processor 203 coupled to the memory 205 and responsive to the request for access to services, wherein the processor denies the request for access to services until a security screen is satisfied by for example entering a correct PIN, unless access to the services corresponds to one of the plurality of identification numbers that has recently been used in accessing services.

These, identification numbers that have recently been used, are stored in one or both of the memory 205 or SIM card 209. Thus a user that recently received a call or viewed a web site will be allowed to place a call or revisit the site without the bother and annoyance of re-entering the PIN number required of prior approaches. Recently used may be defined by time such as within the last day or week and so forth. In many units, recently used is actually set by the size of the memory devoted to recently used ID numbers and this will be determined by the purveyor of the communications devices but may be on the order of 20 or more identification numbers. Thus an active user of this type of communications device may have to re-enter the PIN number or otherwise satisfy the security screens more often than a less active user.

Other circumstances can be identified where entry of the PIN or satisfaction of the security screen can be avoided. For example the processor can deny the request for access to the services until the security screen is satisfied, unless access to the services corresponds to any one of the plurality of identification numbers. However, the processor can still disallow or deny access if an attempt to modify the plurality of identification numbers, e.g. change the phone book, is detected, until or unless the security screen is satisfied by, for example, entering a correct personal identification number (PIN).

One example aspect of controlled access to services is where the memory is arranged to store a first plurality of identification numbers in a recent calls memory and a second plurality of identification numbers in a phone book memory; and the interface generates a request for calling services comprising receiving a call or originating a call to one of the first or the second plurality of identification numbers. The processor can grant the request for calling services to one of the first plurality of identification numbers and deny the request for calling services to one of the second plurality of identification numbers unless a valid personal identification number (PIN) is entered thus satisfying the security screen. If the calling services are granted the transceiver comprising the receiver and transmitter are used for supporting the calling services.

Figure 3:
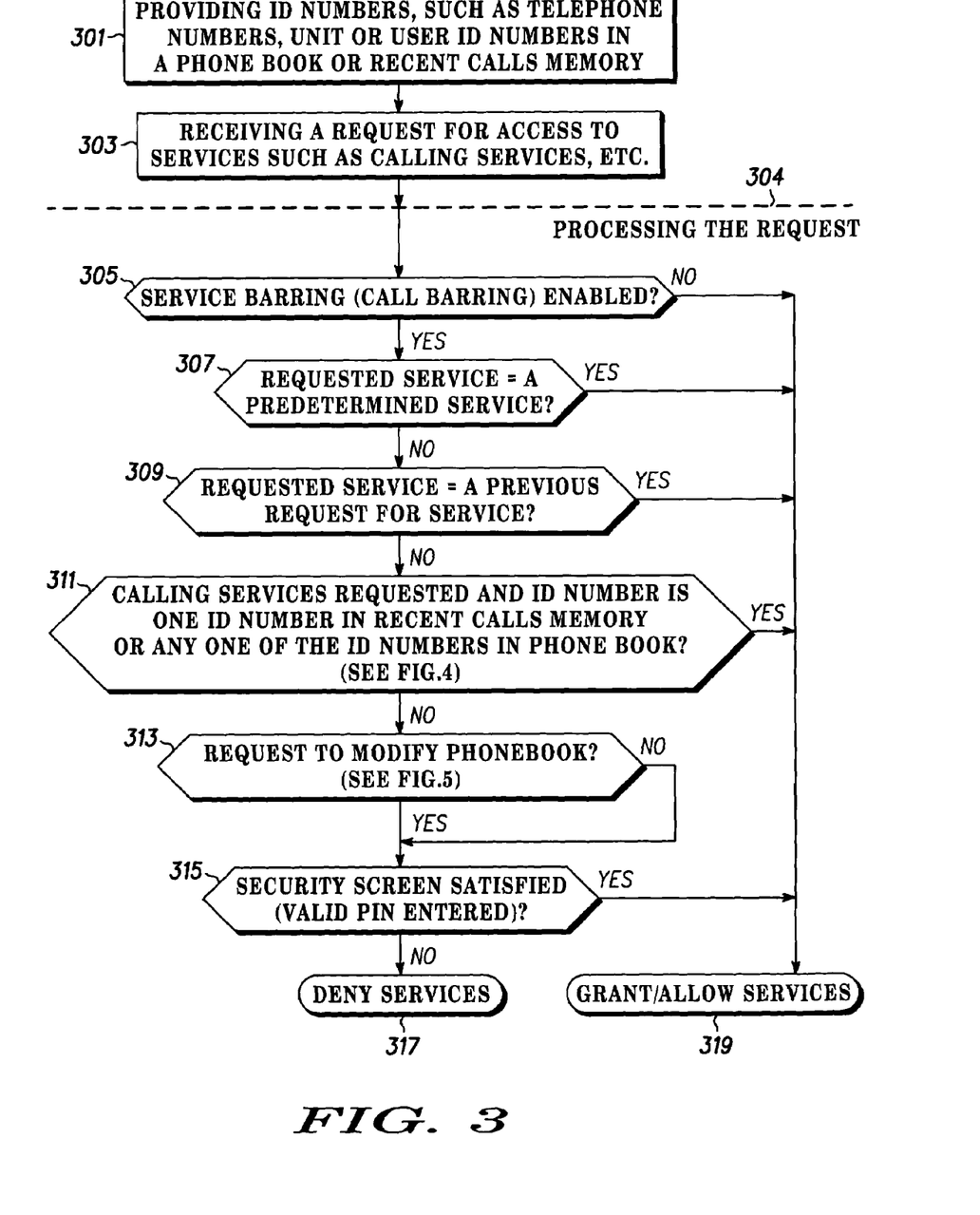
FIG. 3 is a flow diagram of a method embodiment of controlling access to services available from the communications unit of FIG. 2.

Referring to FIG. 3, a flow diagram of a method embodiment of controlling access to services available from the communications unit or other structure will be discussed and described. This method may be executed for example by the communications unit or portions thereof or similar structures. The method begins at 301, by providing a plurality of identification numbers (IDs) such as telephone numbers, unit or user IDs in a phone book or recent calls memory. These IDs for the phone book are usually provided via the user interface 213 but may be provided by an external accessory or the SIM card. The recently called numbers are automatically recorded as services are accessed or calls are made. At 303 a request for access to services, such as calling services, services provided by an application accessed through the communications unit, etc. is received from, for example, the user interface by the controller 201 of FIG. 2. Thereafter the method beginning at 304 processes the request by in summary determining whether a security screen, if enabled has been satisfied, granting the request for access to the services when the security screen has been satisfied, and denying the request for access to the services when the security screen has not been satisfied, unless access to the services corresponds to one of the plurality of identification numbers that has recently been used in accessing services.

Initially at 305, a determination is made as to whether the service barring or call barring is enabled. Service/call barring is enabled to prevent unauthorized use of the communications unit 101. If not the request is granted/allowed at 319. If enabled, then 307 determines whether the requested service is the same as a predetermined service, e.g. access to a home website for the communications unit, call to 911, or the like and if so the service is granted or allowed at 319. If the requested service is not a predetermined service, then 309 determines whether the requested service is equivalent to a previous or recent request for service by comparing the request for access to the services with previous requests for access to the services. Previous requests for service or identification numbers corresponding thereto are stored in the memory, which the controller 201 will recognize. If the requested service is a previous request for service, the request for access to services is granted/allowed at step 319.

If the requested service is not a previous request for service, the controller 201 for example, checks whether calling services are being requested and whether the ID number provided for such services is one ID number in a recent calls memory or any one of the IDs in the phone book at 311. This process is described in more detail later with reference to FIG. 4. If the ID number is one ID in the recent calls memory or any one of the IDs in the phone book, the request for access to services is granted/allowed at step 319.

If the ID number is not in a recent calls memory or the phone book, the controller 201 decides whether the request for services is a request to modify the phone book at step 313, which is further discussed with reference to FIG. 5. Whether or not the request is a request to modify the phone book e.g. is a request for some other services, the communications unit 101 will display a security screen on the user interface 213. The user is prompted to enter an ID number to satisfy the security screen in step 315. If the security screen is satisfied, i.e., a valid PIN is entered, the request for access to services is granted/allowed at step 319. The user may be able to change or disable a PIN if desired. If the security screen is not satisfied, i.e., a valid PIN is not entered, the request for access to services is denied at step 317.

In an alternative embodiment the method comprises providing a first plurality of identification numbers corresponding to recent calls and a second plurality of identification numbers corresponding to a phone book and receiving a request for calling services comprising one of receiving a call and originating a call to one of the first and the second plurality of identification numbers. The processing comprises comprises granting the request for calling services to one of the first plurality of identification numbers and denying the request for calling services to any one of the second plurality of identification numbers unless a valid personal identification number (PIN) is entered.

Figure 4:
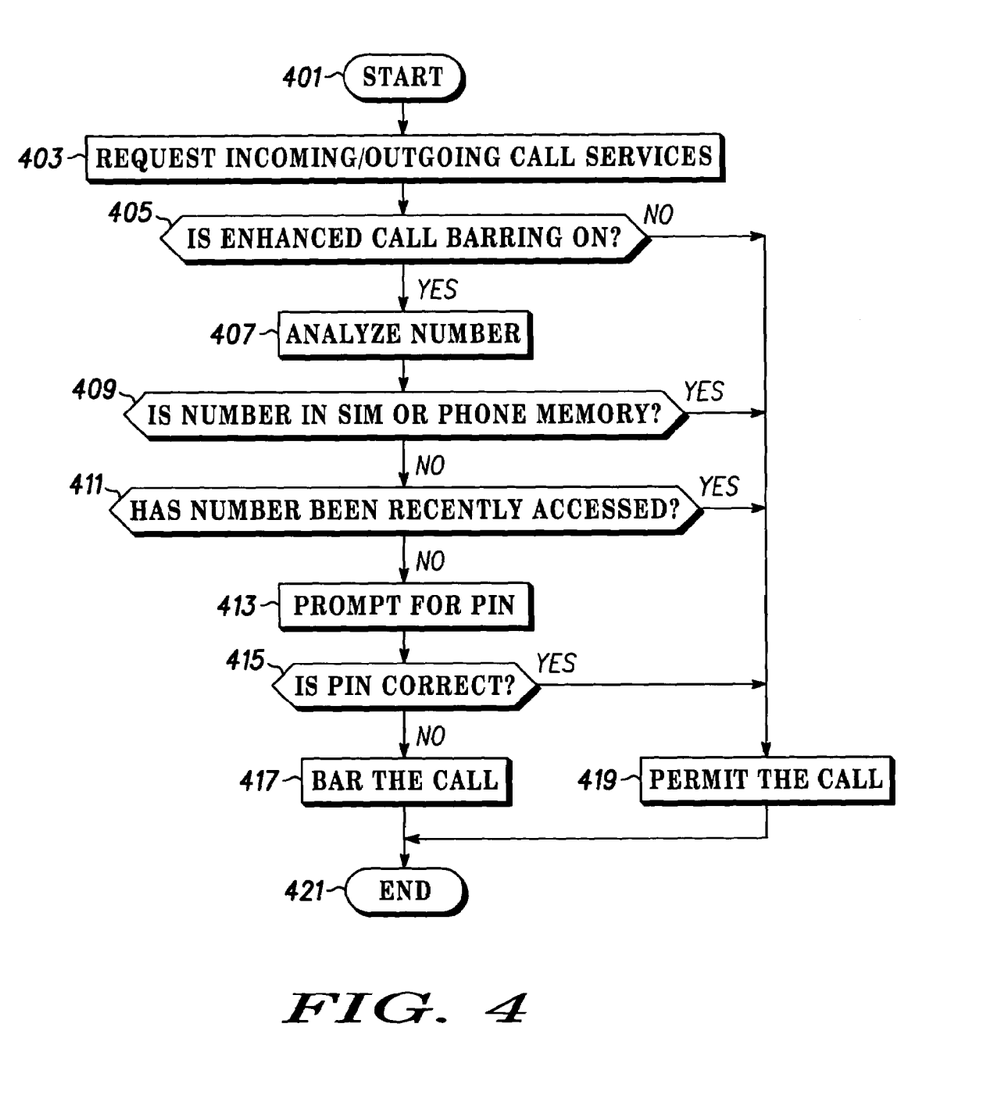
FIG. 4 is a flow diagram of a method embodiment demonstrating in more detail a method of enhanced call barring when an attempt is made to initiate a call services in the communication unit of FIG. 2.

Referring now to FIG. 4, a flow diagram of a method embodiment demonstrating in more detail a method of enhanced call barring when an attempt is made to initiate call services in the communication unit will be discussed and described. This is a more detailed and further aspect of the process shown at 311 and starts at 401 and thereafter at 403 a request for calling or call services, either sending or originating an outgoing call or receiving an incoming, is received. The outgoing call may be initiated by a user. The controller 201, for example, checks whether enhanced call barring is on at step 405. If enhanced call barring is not on, the call is permitted at step 419 and the routine ends at step 421.

If enhanced call barring is on, the telephone number is analyzed at step 407. The analysis includes a comparison of whether the telephone number associated with the call services is stored in the SIM or phone book memory at 409. If the telephone number is already in the SIM or phone book, the call is permitted at step 419 and the routine ends at step 421.

If the telephone number is not in the SIM or phone book memory, the telephone number is analyzed to check whether it has been recently accessed at 411, e.g. is stored in a recent calls memory. The communications unit stores the telephone numbers of the last calls received, sent, or missed in the recent calls list. If the telephone number is in the recent calls memory, the call is permitted at 419 and the routine ends at 421.

If the telephone number is not in the recent calls memory, the user is prompted to enter a PIN at 413. Until a valid PIN is entered at 415, the call service request e.g. call is barred at 417. Normally the user can still use the communications unit to make emergency calls. When the user enters a valid PIN, the call is permitted at step 419 and the routine ends at step 421. When the user enters an invalid PIN, the call is barred and the routine ends at step 417.

Figure 5:
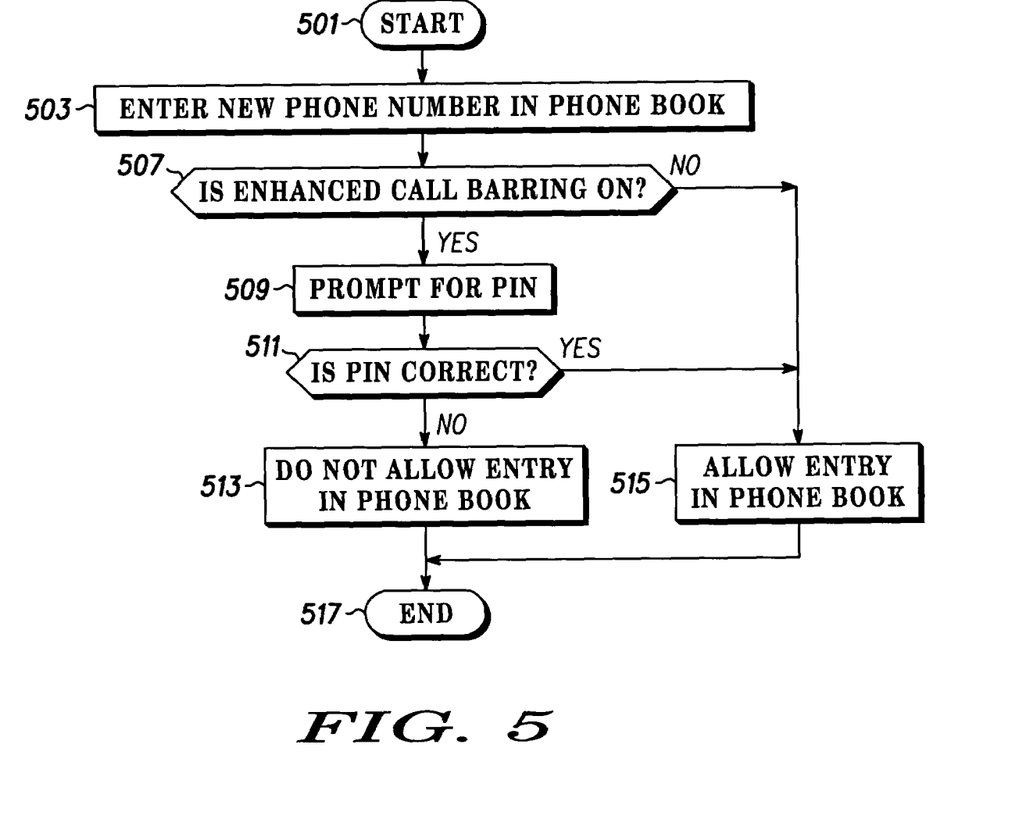
FIG. 5 is a flow diagram of a method embodiment demonstrating in more detail a method of enhanced call barring when an attempt is made to enter a telephone number in the phone book in the communication unit of FIG. 2.

FIG. 5 is a flow diagram of the methodology used when an attempt is made to enter a telephone number in the phone book using call barring in the wireless communication unit of FIG. 2.

At an idle screen of the user interface 213 of FIG. 2, a user can start at 501 an access to services such as entry of a telephone number in the phone book. The telephone number is entered at 503. The controller 201 of FIG. 2 checks whether enhanced call barring is on at 507. If enhanced call barring is not on, the telephone is allowed to make the entry in the telephone book at 515 and the routine ends at 517.

If enhanced call barring is on, the user is prompted to enter a PIN at 509. Until a valid PIN is entered, the user cannot enter telephone numbers into the phone book. When the user enters a valid PIN, the entry of the telephone number is allowed at 515 and the routine ends at 517. When the user enters an invalid PIN at 511, entry of the telephone number is barred at 513 and the routine ends at 517.

The approach of the present disclosure includes enhanced call and service barring methods and apparatus including software provided in the communications unit, however, call barring data may be stored in a supplementary service (SS) database. The SS database may be located in an intelligent network (IN) node connected to the mobile service center/visitor location register (MSC/VLR) in the network or in the home location register (HLR).

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A system for controlling access to services available from a communications unit, the system comprising:
   a memory arranged to store a plurality of identification numbers; and
   a processor coupled to the memory and responsive to a request for access to services,
   wherein the processor denies the request for access to the services until a security screen is satisfied, unless access to the services corresponds to one of the plurality of identification numbers that has recently been used in accessing services.

2. The system of claim 1, wherein the memory comprises one of an internal memory and an external memory.

3. The system of claim 1, wherein the plurality of identification numbers comprises one of telephone numbers, unit identification numbers, and user identification numbers.

4. The system of claim 1, wherein the processor further denies the request for access to the services until the security screen is satisfied, unless access to the services corresponds to any one of the plurality of identification numbers.

5. The system of claim 1, wherein the processor denies a request to modify the plurality of identification numbers, unless the security screen is satisfied.

6. The system of claim 5, further comprising a user interface for conveying the request for access to the services to the processor and for entering a personal identification number (PIN) to satisfy the security screen.

7. The system of claim 1, wherein the request for access to the services include a request for access to one of calling services and services provided by an application accessed through the communications unit.

8. A communications unit having controlled access to services, the communications unit comprising:
   a memory arranged to store a plurality of identification numbers;
   an interface for providing a request for access to services; and
   a processor coupled to the memory and responsive to the request for access to services,
   wherein the processor denies the request for access to services until a security screen is satisfied, unless access to the services corresponds to one of the plurality of identification numbers that has recently been used in accessing services.

9. The communications unit of claim 8, wherein the memory comprises one of internal memory and a subscriber identity module (SIM).

10. The communications unit of claim 8, wherein the plurality of identification numbers comprises one of telephone numbers, unit identification numbers and user identification numbers.

11. The communications unit of claim 8, wherein the processor further denies the request for access to the services until the security screen is satisfied, unless access to the services corresponds to any one of the plurality of identification numbers.

12. The communications unit of claim 8, wherein the processor disallows an attempt to modify the plurality of identification numbers, until the security screen is satisfied by entering a correct personal identification number (PIN).

13. The communications unit of claim 8, wherein the interface provides the request for access to one of calling services and services provided by an application accessed through the communications unit.

14. The communications unit of claim 13,
   wherein the memory is arranged to store a first plurality of identification numbers in a recent calls memory and a second plurality of identification numbers in a phone book memory;
   wherein the interface generates the request for calling services comprising one of receiving a call and originating a call to one of the first and the second plurality of identification numbers;
   wherein the processor grants the request for calling services to one of the first plurality of identification numbers and denies the request for calling services to any one of the second plurality of identification numbers unless a valid personal identification number (PIN) is entered thus satisfying the security screen; and
   wherein the communications unit further comprises a transceiver for supporting the calling services when granted.

15. A method for controlling access to services available from a communications unit, the method comprising:
   providing a plurality of identification numbers;
   receiving a request for access to services; and
   processing the request for access to services, wherein the processing further comprises,
      determining whether a security screen has been satisfied,
      granting the request for access to the services when the security screen has been satisfied, and
      denying the request for access to the services when the security screen has not been satisfied, unless access to the services corresponds to one of the plurality of identification numbers that has recently been used in accessing services.

16. The method of claim 15, wherein die providing the plurality of identification numbers further comprises providing one of telephone numbers, unit identification numbers and user identification numbers.

17. The method of claim 15, wherein the denying the request for access to the services further includes denying the request for access to the services until the security screen is satisfied, unless access to the services corresponds to any one of the plurality of identification numbers.

18. The method of claim 15, further comprising:
   storing the plurality of identification numbers into a memory; and
   forbearing an attempt to modify the plurality of identification numbers, until the security screen is satisfied by entry of a valid personal identification number (PIN).

19. The method of claim 15, further comprising:
   comparing the request for access to the services with previous requests for access to the services; and
   allowing the access to services if the comparing is favorable.

20. The method of claim 15, wherein processing further comprises allowing a request for access to a predetermined service.

21. The method of claim 15, wherein the receiving the request for access to the services further comprises receiving a request for access to one of calling services and services provided by an application accessed through the communications unit.

22. The method of claim 21, further comprising:
   providing a first plurality of identification numbers corresponding to recent calls and a second plurality of identification numbers corresponding to a phone book,
   wherein the request for calling services comprises one of receiving a call and originating a call to one of the first and the second plurality of identification numbers; and
   wherein the processing comprises granting the request for calling services to one of the first plurality of identification numbers and denying the request for calling services to any one of the second plurality of identification numbers unless a valid personal identification number (PIN) is entered.

* * * * *

UNITED STATES PATENT AND TRADEMARK OFFICE
CERTIFICATE OF CORRECTION

| | |
|---|---|
| PATENT NO. | : 7,120,423 B2 |
| APPLICATION NO. | : 10/616657 |
| DATED | : October 10, 2006 |
| INVENTOR(S) | : Bourke et al. |

Page 1 of 1

It is certified that error appears in the above-identified patent and that said Letters Patent is hereby corrected as shown below:

In Column 10 line 61 please delete " die" and insert --the--

Signed and Sealed this

Sixth Day of February, 2007

JON W. DUDAS
*Director of the United States Patent and Trademark Office*